United States Patent
Chen et al.

(10) Patent No.: US 10,733,201 B1
(45) Date of Patent: Aug. 4, 2020

(54) DYNAMIC PROVISIONING FOR DATA REPLICATION GROUPS

(71) Applicant: Amazon Technologies, Inc., Seattle, WA (US)

(72) Inventors: Tao Chen, Sammamish, WA (US); Madhuvanesh Parthasarathy, Seattle, WA (US); Shobha Agrawal, Seattle, WA (US); Fan Ping, Kenmore, WA (US); Divya Ashok Kumar Jain, Bellevue, WA (US); Marc John Brooker, Seattle, WA (US); Matthew Joseph Zulak, Seattle, WA (US); Lakshmi N. Pallikila, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 759 days.

(21) Appl. No.: 14/954,987

(22) Filed: Nov. 30, 2015

(51) Int. Cl.
  *G06F 16/27* (2019.01)
  *G06F 11/14* (2006.01)
  *H04L 29/08* (2006.01)

(52) U.S. Cl.
  CPC .......... *G06F 16/27* (2019.01); *G06F 11/1402* (2013.01); *H04L 67/10* (2013.01)

(58) Field of Classification Search
  USPC ......................................................... 707/623
  See application file for complete search history.

(56) References Cited

U.S. PATENT DOCUMENTS

| | | | |
|---|---|---|---|
| 5,909,540 | A  | 6/1999  | Carter et al. |
| 6,374,241 | B1 | 4/2002  | Lamburt et al. |
| 6,662,219 | B1 | 12/2003 | Nishanov et al. |
| 7,039,773 | B2 | 5/2006  | Hu et al. |
| 7,461,130 | B1 | 12/2008 | AbdelAziz et al. |
| 7,711,820 | B2 | 5/2010  | Sharma et al. |
| 7,937,482 | B1 | 5/2011  | Vermeulen et al. |
| 8,301,600 | B1 | 10/2012 | Helmick et al. |
| 8,572,031 | B2 | 10/2013 | Merriman et al. |
| 8,732,517 | B1 | 5/2014  | Stefani et al. |
| 8,843,441 | B1 | 9/2014  | Rath et al. |
| 8,856,593 | B2 | 10/2014 | Eckhardt et al. |
| 8,868,514 | B2 | 10/2014 | Lomet et al. |

(Continued)

OTHER PUBLICATIONS

Abadi, "Consistency Tradeoffs in Modern Distributed Database System Design," Computer 45(2):37-42, Feb. 2012.

(Continued)

*Primary Examiner* — James Trujillo
*Assistant Examiner* — John J Morris
(74) *Attorney, Agent, or Firm* — Davis Wright Tremaine LLP

(57) ABSTRACT

Data replication groups may be used to store data in a distributed computing environment. The data replication groups may include a set of nodes executing a consensus protocol to maintain data durably. In order to increase the speed of provisioning, a data replication may be provision with less than the total number of nodes to be included in the group. Once an initial set of nodes have been provisioned and are implementing a consensus protocol, the data replication group may begin to receive traffic. Furthermore, new nodes may be added to the group until the total number of nodes for the group has been reached.

20 Claims, 11 Drawing Sheets

(56) References Cited

U.S. PATENT DOCUMENTS

| | | |
|---|---|---|
| 8,965,849 B1 | 2/2015 | Goo |
| 9,047,246 B1 | 6/2015 | Rahut |
| 9,047,331 B2 | 6/2015 | Rao et al. |
| 9,223,843 B1 | 12/2015 | Madhavarapu et al. |
| 9,230,000 B1 | 1/2016 | Hsieh et al. |
| 9,317,576 B2 | 4/2016 | Merriman et al. |
| 9,489,434 B1 | 11/2016 | Rath |
| 9,552,242 B1 | 1/2017 | Leshinsky et al. |
| 9,569,513 B1 | 2/2017 | Vig et al. |
| 9,639,589 B1 | 5/2017 | Theimer et al. |
| 9,805,108 B2 | 10/2017 | Merriman et al. |
| 10,171,629 B2 | 1/2019 | Bute et al. |
| 10,489,230 B1 | 11/2019 | Chen et al. |
| 2002/0161889 A1 | 10/2002 | Gamache et al. |
| 2004/0263152 A1 | 12/2004 | Ahrikencheikh |
| 2005/0005200 A1 | 1/2005 | Matena et al. |
| 2006/0020634 A1 | 1/2006 | Huras et al. |
| 2006/0218204 A1 | 9/2006 | Ofer et al. |
| 2007/0156842 A1* | 7/2007 | Vermeulen ........ G06F 17/30212 709/217 |
| 2007/0299955 A1 | 12/2007 | Hoffman et al. |
| 2009/0049240 A1 | 2/2009 | Oe et al. |
| 2010/0274768 A1 | 10/2010 | Wang et al. |
| 2011/0307886 A1 | 12/2011 | Thanga et al. |
| 2012/0011398 A1* | 1/2012 | Eckhardt ............ G06F 11/2028 714/15 |
| 2012/0117229 A1 | 5/2012 | Van Biljon et al. |
| 2012/0197868 A1 | 8/2012 | Fauser et al. |
| 2013/0110774 A1 | 5/2013 | Shah et al. |
| 2013/0290249 A1* | 10/2013 | Merriman ............. G06F 16/273 707/610 |
| 2014/0032506 A1 | 1/2014 | Hoey et al. |
| 2014/0136896 A1 | 5/2014 | Tak et al. |
| 2014/0172944 A1 | 6/2014 | Newton et al. |
| 2014/0337393 A1 | 11/2014 | Burchall et al. |
| 2015/0169417 A1 | 6/2015 | Brandwine et al. |
| 2015/0186229 A1 | 7/2015 | Bortnikov et al. |
| 2015/0347548 A1 | 12/2015 | Mortensen et al. |
| 2015/0372389 A1 | 12/2015 | Chen et al. |
| 2016/0147859 A1 | 5/2016 | Lee et al. |
| 2017/0004317 A1 | 1/2017 | Bumbulis |
| 2017/0270176 A1 | 9/2017 | Horowitz et al. |
| 2017/0366451 A1 | 12/2017 | Schreter |
| 2017/0366619 A1 | 12/2017 | Schreter |
| 2017/0371567 A1 | 12/2017 | Piduri |

OTHER PUBLICATIONS

Bernstein, "Rethinking Eventual Consistency," Proceedings of the 2013 ACM SIGMOD International Conference on Management of Data, Jun. 22-27, 2013, 5 pages.

Chandy et al., "Distributed Snapshots: Determining Global States of Distributed Systems," ACM Transactions on Computer Systems 3(1):63-75, Feb. 1985.

Decandia et al., "Dynamo: Amazon's Highly Available Key-value Store," ACM SIGOPS Operating Systems Review 41(6):205-220, Oct. 14, 2007.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Lamport, "Paxos Made Simple," Microsoft Research, http://research.microsoft.com/en-us/um/people/lamport/pubs/paxos-simple.pdf [retrieved Aug. 22, 2016], 2001, 14 pages.

Letia et al., "CRDTs: Consistency without concurrency control," Rapport de recherche 6956, Jun. 2009, 13 pages.

MacCormick et al., "Niobe: A Practical Replication Protocol," Microsoft Research, https://www.microsoft.com/en-us/research/wp-content/uploads/2007/08/tr-2007-112.pdf [retrieved Aug. 22, 2016], 2007, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, http://arxiv.org/pdf/1209.4187.pdf [retrieved Aug. 22, 2016], 2012, 9 pages.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science) &oldid=783901344, 19 pages.

"Ford-Fulkerson Algorithm," Wikipedia, The Free Encyclopedia, Aug. 9, 2016, https://en.wikipedia.org/wiki/Ford%E2%80%93Fulkerson_algorithm [Retrieved Aug. 29, 2016], 5 pages.

"Maximum flow problem," Wikipedia, The Free Encyclopedia, Aug. 22, 2016, https://en.wikipedia.org/wiki/Maximum_flow_problem [Retrieved Aug. 29, 2016], 11 pages.

Chen et al., "Replication Group Pools for Fast Provisioning," U.S. Appl. No. 14/954,928, filed Nov. 30, 2015.

Dhoolam et al., "Node Placement for Replication Groups," U.S. Appl. No. 15/264,479, filed Sep. 13, 2016.

* cited by examiner

DYNAMIC PROVISIONING FOR DATA REPLICATION GROUPS

CROSS-REFERENCE TO RELATED APPLICATIONS

This application incorporates by reference for all purposes the full disclosure of co-pending U.S. patent application Ser. No. 14/954,928, filed concurrently herewith, entitled "REPLICATION GROUP POOLS FOR FAST PROVISIONING."

BACKGROUND

Organizations invest in technologies that provide customers with access to computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is increase cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
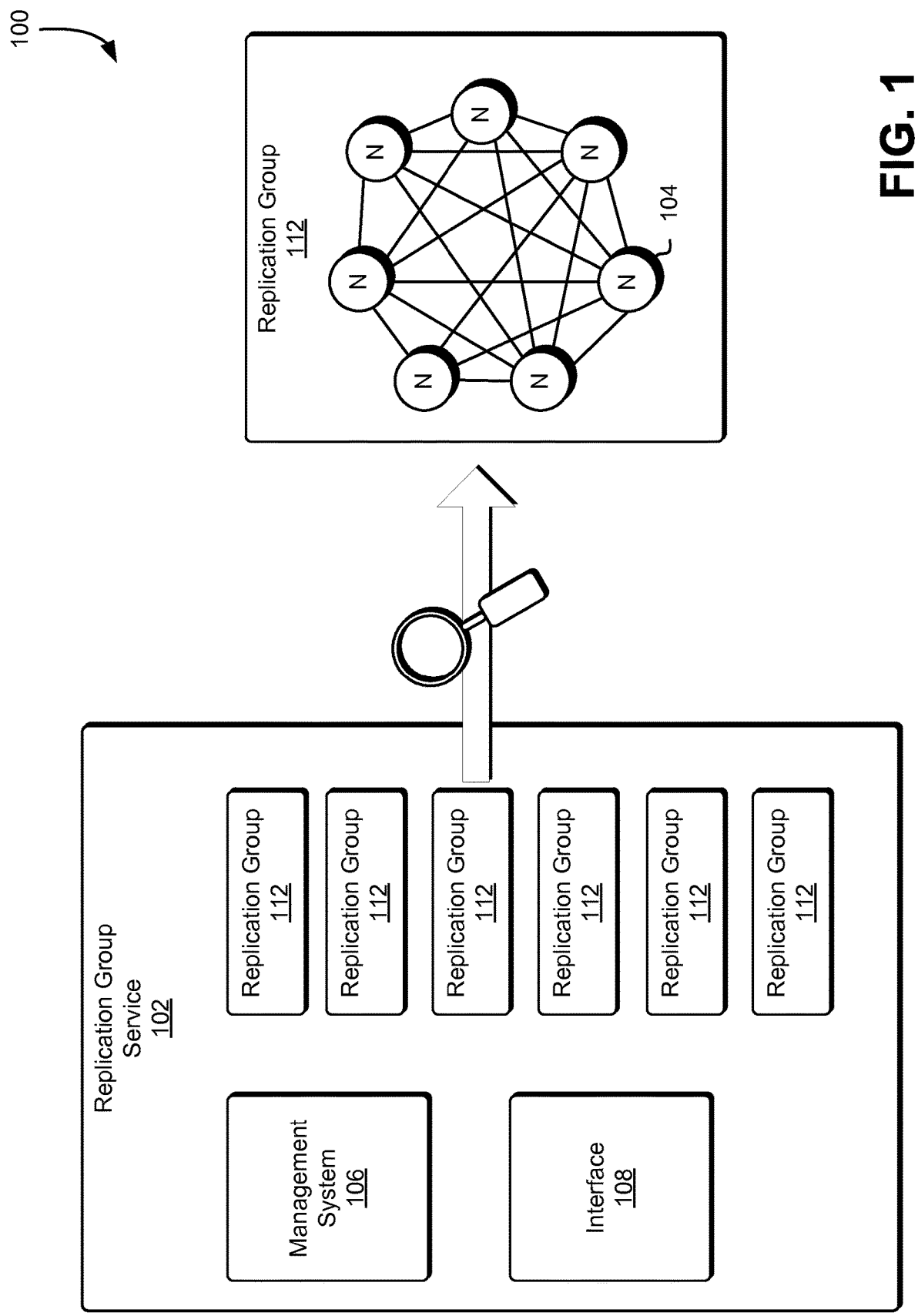
FIG. 1 illustrates aspects of a replication group which may be used to maintain replicas of data and provide consistency between the data replicas in accordance with at least one embodiment.

In various examples described below, a pool of data replication groups is used to enable faster provisioning of computing resources to systems and/or services which require data replication groups. In distributed computing systems, data replication reduces the risk of failure and mitigate possible data loss in the case of system failure. A data replication group may consist of some number of nodes executed by one or more host computer systems, where the nodes implement a consensus protocol, such as Paxos, to enable consistent data replication between the nodes. In general, provisioning of data replication groups requires additional resource and time relative to a single host. Both the resource and time requirement may increase incrementally along with the size of the replication group. One way to reduce the amount of time required to provision a data replication group is to maintain a set of pre-created data replication groups. When a request for a data replication group is received from requestor, a data replication group may be selected from the pool and provided to the requestor in response to the request.

To provision data replication groups in this manner, a pool of M data replication groups is initialized prior to receiving and/or processing requests, where M is a positive integer. Additionally, the pool is initialized but the data replication groups may not accept traffic until one or more of the data replication groups in the pool are assigned and/or associated with a computer system or service. Once a request for allocation of a data replication group is received, a data replication group may be selected and removed from the pool. The selected data replication group may then be associated with the request and begin receiving traffic. For example, the data replication group may be associated with a particular computer system or storage system and may maintain the current state of that system. In another example, the data replication group may be associated with a particular customer and may begin storing data on behalf of the customer.

In another example, a data replication group may be provisioned with an initial membership of N nodes and X number of nodes may be incrementally added to the data replication group until there are M members in the data replication group, where N and X are positive integers. For an initial membership of N nodes, where N is less than M, the time to provision the data replication group can be reduced. Furthermore, a data replication group may be configured such that the data replication group may receive traffic and perform operations with an initial membership of N nodes. For example, a data replication group implementing the Paxos protocol may be configured with an initial membership of one node. At this point, the data replication group may begin to receive traffic and perform operations in accordance with the Paxos protocol. The data replication group may then start to add new members until a desired number of nodes is reached. This method enables faster provisioning of the data replication group while eventually providing robust data storage. The initial membership N of the data replication group and the total number of node M may be determined based at least in part on the tolerance of the application, computer system, or service support by the data replication group, including provisioning time.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider may operate a replication group service 102 configured to manage one or more data replications groups 112. The nodes 104 of the replication group 112 may store copies or replicas of data so as to provide redundancy in the event of the loss of some number of nodes 104. Replication group service 102 may be configured as a clustered storage system for storing customer data, metadata about customer data, or other data across a plurality of physical hosts. Such a clustered storage configuration may reduce the risk of failure and increase availability of the data replication groups 112 or particular nodes of the data replication groups 112 during network connection events and/or network connection issues. The data replication service 102 may maintain a plurality of data replication groups 112; in turn, each data replication group 112 may consist of a plurality of nodes 104. The data replication groups 112 may include replicated state machines or other storage systems configured to store data in a distributed computing environment. In various embodiments, each node 104 is a process, executed by a host computer system or other computer system, described in greater detail below, which participates in one or more data replication groups 112. For example, for a particular data replication group 112 implementing the Paxos consensus protocol, each node 104 of the data replication group 112 may implement one or more roles of the Paxos consensus protocol such as the role of acceptor, proposer, and/or learner. In this manner, the nodes 104 of the data replication group may be responsible for the durability of customer data or other data maintained by the data replication group 112.

The Paxos consensus protocol may include a family of different protocols configured to solve consensus issues in a network of unreliable processors (e.g., computer systems and networks that are subject to possible failures). The Paxos consensus protocol ensures agreement on one result and/or one operation among a group of participants, for example, the nodes 104 of the data replication group 112. The Paxos consensus protocol may be used by replication service 102 and the data replication groups 112 to implement state machine replication and/or data replication in a distributed computing environment, such as a computing resource service provider environment 100 illustrated in FIG. 1. The Paxos consensus protocol may define the set of actions which may be performed by the nodes 104 of the data replication groups 112 according to one or more predefined roles included in the Paxos consensus protocol: client, acceptor, proposer, learner, and leader. In some embodiments, a single node 104 of a particular data replication group 112 may implement one or more roles at any given time. For example, a particular node 104 may be a leader, acceptor, and learner in accordance with the Paxos consensus protocol.

A client, which may include a computer system under the control of a customer of the computing resource service provider and/or application or other executable code executed by one or more other computer systems or services of the computing resource service provider, may issue requests to the data replication group 112 and/or replication service 102 and wait for a response. For example, the client may include a customer transmitting a storage request to an interface 108 of the replication service 102. The interface 108 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer.

In accordance with the Paxos protocol, acceptors implemented by one or more nodes 104 of a data replication group 112 may be collected or assembled into groups, collectively referred to as quorums. In various embodiments of the Paxos protocol, any message sent to an acceptor must be sent to the quorum of acceptors and any message received from an acceptor is ignored unless a copy is received from each acceptor in the quorum. A proposer, when implemented by a node 104 of the data replication group 112, may transmit proposals to acceptors, a proposal may include a message attempting to reach an agreement on a value and/or action by the acceptors. A learner, when implemented by a node 104 of the data replication group 112, may perform some action once an agreement is reach (e.g., transmit a response to the client). In general, any protocol that satisfies the consensus requirements of the replication service 102 and data replication groups 112 may be implemented in accordance with the embodiments described herein. Furthermore, in some embodiments, additional constraints may be placed on the consensus protocol implemented by the replication service 102 and data replication groups 112 as required. For example, the replication service 102 and data replication groups 112 may require the implemented consensus protocol to allow for the addition of a new member and/or node 104 to the data replication group 112 at some point in time after the initialization of the data replication group 112.

Additionally, the number of nodes 104 in the data replication group 112 may vary depending on the latency and durability requirements of the customer, other service of the computer system, or replication service 102. For example, the number of nodes 104 in the data replication 112 may be reduce if a particular service and/or customer requires reduced latency and response time. In contrast, if a customer and/or service requires higher fault tolerance and data durability, the number of nodes 104 in the data replication group 112 may be increased. A management system 106 of the data replication service 102 may be responsible for determining the number of nodes 104 in a particular data replication group. The management system 106 may be a process or other application executed by a host computer system. Furthermore, the management system 106 may be responsible for creation, termination, and assignment of the data replication groups. For example, the management system 106 may determine that a new data replication group is to be created and may communicate with one or more other service (not shown in FIG. 1 for simplicity) of the computing resource service provider in order to create the new data replication group 112. The process of creating new data replication groups 112 is described in greater detail below. The management system 106 may also be responsible for assigning and/or associating a particular data replication group 112 to a customer or other service. For example, the management system 106 may map a particular data replication group 112 or address of the particular data replication group to a customer such that the particular data replication group 112 may receive traffic from or on behalf of the customer.

Figure 2:
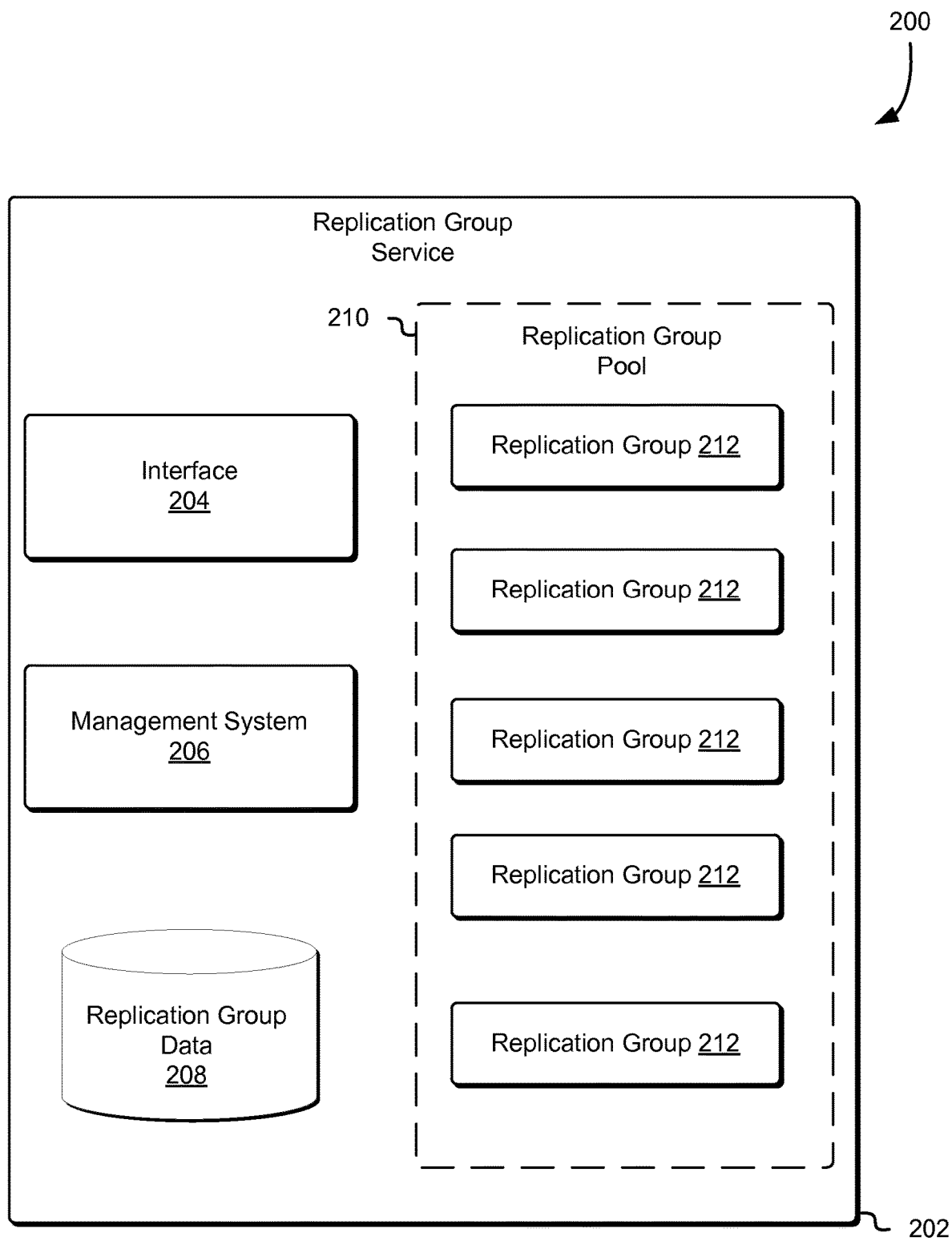
FIG. 2 illustrates an environment in which a set of replication groups may be configured to operate as a pool or replication groups in accordance with at least one embodiment.

FIG. 2 illustrates an environment 200 in which a computing resource service provider may operate a replication group service 202 configured to manage one or more data replications groups 212 in a pool 210 of data replication groups 212. Provisioning a data replication group 212 such that it may implement a consensus protocol and begin to receive traffic may increase latency or violate the terms of a service-level agreement (SLA). An SLA may be part of a service contract or other agreement between a computing resource service provider and a customer where a particular service is formally defined. Particular aspects of the service (e.g., scope, quality, responsibilities, latency, availability) may be agreed on between the computing resource service provider and the customer. The pool 210 of data replication groups 212 may enable the computer resource service provider to achieve a predefined level of performance as indicated in a particular SLA. The pool 210 of data replication groups 212 may enable replication groups service 202 to asynchronously respond to a request for data replication groups 212 and provision new data replication groups 212.

In addition, there may be application and/or service that require reduced latency when provisioning a particular data replication group 212 to receive traffic on behalf of the application or service. For example, a customer application may require the creation of a data replication group 212 for storage of customer data in a shorter time interval relative to an amount of time required to provision a data replication group 212. In order to achieve lower latency as may be required, a pool 210 of data replication groups 212 may be created such that fully functional data replication groups 212 are available when required without the need of provisioning a new data replication group 212. As described above, the replication group service 202 may include an interface 204 and management system 206. Furthermore, although all of the data replication groups 212 illustrated in FIG. 2 are a member of the pool 210, other configurations of data replication groups 212 and pools 210 are within the scope of the present disclosure. For example, the replication group service 202 may maintain one or more data replication groups 212 outside of or aside from the pool 210 of data replication groups 212. In another example, the replication group service may maintain a plurality of pools 210.

The replication group service 202 may further include replication group data 208. Replication group data 208 may consist of data corresponding to the data replication groups 212, nodes of the data replication groups, customers or services mapped to the data replication groups 212, and any such other data as required by the management system 206 and/or replication group service 202. The replication group data 208 may be maintained in a database of other data stores such that the data is accessible and/or queryable by other components of the replication group service 102, customer, or other services. In one example, replication data group data 208 may maintain data to aid in discovery of nodes by one or more other nodes of the data replication groups 212. This data may include a mapping of data replication groups 212 identification information to nodes of the data replication group. Furthermore, the data may include information about particular nodes and/or roles of the particular nodes. For example, an input/output (I/O) request may be received at the interface 204 of the data replication service 202. The I/O request may indicate a particular data replication group 212, the replication group service 202 or component thereof, and may query the replication group data 208 in order to determine a leader or other node of the data replication group 212 designated to receive the I/O request.

The data in the replication group data 208 may be updated at various intervals of time. For example, the management system 206 may query the nodes and/or data replication groups 212 in order to obtain information useable to update the replication group data 208. The replication group data 208 may also include information corresponding to the number of data replication groups 212 in the pool 210, a maximum number of data replication groups 212 to be included in the pool 210, and a frequency or number of requests for data replication groups 212 received by the replication group service 202. The replication group service 202 or component thereof may utilize this information to determine a rate at which data replication groups 212 are to be added to the pool 210. The process for adding data replication groups 212 to the pool 210 may include identifying a set of physical hosts suitable for hosting a new data replication group 212, initializing nodes on the set of physical hosts to be included in the new data replication group 212, initializing a consensus protocol among the nodes, validating the health of the data replication group 212, and updating the replication data store 208 to indicate that the new data replication group 212 is ready to receive traffic and is a member of the pool 210. Validating the health of a node and/or data replication group 212 may include a determination that the consensus protocol is executing correctly on the node and/or data replication group 212. The consensus protocol may include a heartbeat or other messages exchanged between nodes of the data replication group 212 that indicate that a particular node is operating as expected. A data replication group 212 may be considered healthy is a majority of the nodes of the data replication group 212 are operating as expected (e.g., have successfully validate the health of the node).

The pool 210 of data replication groups 212 may include a number M of data replication groups 212. This number M of data replication groups 212 may be initialized prior to the replication group service 202 assigning the data replication groups 212 of the pool 210 and/or the data replication groups 212 of the pool 210 receiving requests and/or other traffic (e.g., network traffic from outside the data replication group 212). A request for allocating storage for a new resource, customer, or other service may then be received by the replication groups service 202 at the interface 204. The management system 208 or other component of the replication groups service 202 may then select a data replication group 212 and the selected data replication group 212 may be removed from the pool 210.

The data replication group 212 may be selected based at least in part on a variety of factors, such as the health of the data replication group 212, the time at which the data replication group 212 was created, a position of the data replication group 212 in a queue, attributes of the data replication group 212 (e.g., number of nodes, physical hosts implementing the nodes, location, latency, processing power, failure rate, etc.), a consensus protocol executed by the data replication group 212, and other factors that are suitable for selecting a particular data replication group 212 to fulfill a request. The selected data replication group 212 may then be associated with the new resource, customer, or other service responsible for submitting the request. At this point the data replication group 2121 may be ready to receive requests and store data.

An asynchronous process and/or thread may then triggered by the data replication service 202 or component thereof such as the management system 208 in order to replace the data replication group 212 removed from the pools 210. This process and/or thread may be executed at a point in time of removal of the data replication groups 212 from the pool 210 or may be trigger based at least in part on other factors. For example, the process and/or thread to add new data replication groups 212 to the pool 210 may be executed based at least in part on the expiration of an interval of time. In another example, the process and/or thread to add new data replication groups 212 to the pool 210 may be executed based at least in part on a request rate for data replication groups 212 received by the replication groups service or component thereof, such as the interface 204.

Figure 3:
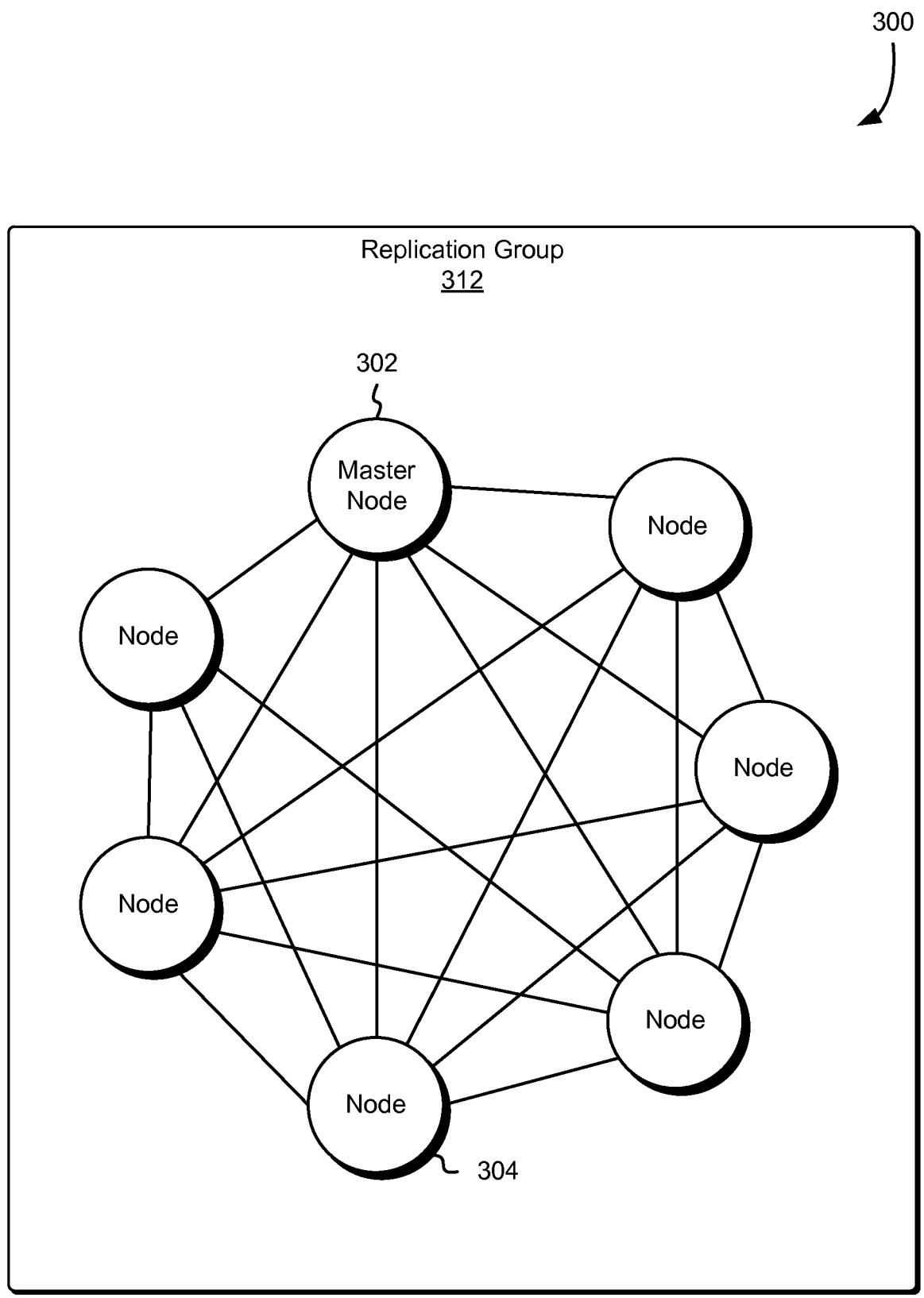
FIG. 3 illustrates configuration properties of a replication group, including replication group nodes, which may be used for implementing various types of consensus, according to at least one embodiment.

FIG. 3 illustrates an environment 300 in which a data replication group 312 may implement a consensus protocol between one or more nodes 304 in accordance with at least one embodiment. In addition, at least one node 304 of the data replication group 312 may be a master node 302. Each node 304, including the master node 302, may be software or other executable code maintained in the memory of a physical host or other server computer system and executed by the physical host or other server computer system in order to provide the functionality described herein. Furthermore, the nodes 304 and master node 302 may be executed by one or more distinct physical hosts or other server computer systems. For example, two nodes 304 of the data replication group 312 may be executed by a first physical host and the remaining nodes 304, including the master node 302, of the data replication group 312 may be executed by a second physical host. The physical hosts are described in greater detail below.

The nodes 304 and master node 302 of the data replication group 312 may be connected (illustrated as a line between the nodes in FIG. 3) through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 304 and master node 302 may be distributed across physical hosts and networks such that failure of one or more networks or physical hosts does not cause all of the nodes 304 of the data replication group 312 to fail. Although six nodes 304 and one master node 302 are illustrated in FIG. 3, any number of nodes 304 and master nodes 302 may be included in the data replication group 312 and distributed across a plurality of distributed computer systems in accordance with the present disclosure. However, in some embodiments, only a single master node 302 is included in the data replication group 312. This restriction may be required by the consensus protocol implemented by the data replication group 312 or may be a restriction enforced in order to increase efficiency and/or optimize execution of the data replication group 312. The master node 302 may be selected and/or determined from the set of nodes 304 in the data replication group 312. For example, the data replication group 312 may be initialized with seven nodes 304 and a master node 302 may be selected from the set of seven nodes 304.

The data replication group 312 may further include software or other executable code configured to manage the operation of the data replication group 312, nodes 304, and/or master node 302. Managing the operation of the data replication group 312 may include creating new nodes 304, replacing failed nodes 304, providing discovery of nodes, backing up data maintained by the nodes 304, determining roles of the consensus protocol to be performed by the nodes 304, selecting a master node 302, and other such operations as required to ensure the functioning of the data replication group 312. In various embodiments, the master node 302 executes the leader role, as described above, of the Paxos consensus protocol. Furthermore, the master node 302 may ensure progress towards eventually consistent data storage and reads from the various nodes 304 of the data replication groups 312. The data replication group 312, illustrated in FIG. 3, may be used in connection with various embodiments described herein. For example, the data replication group 312 may be a member of a pool of data replication groups described above in connection with FIG. 2. Additionally, the data replication group 312 may be initialized with a certain number of nodes 304 and may increase the number of nodes 304 over an interval of time until a desired number of nodes in reached.

Figure 4:
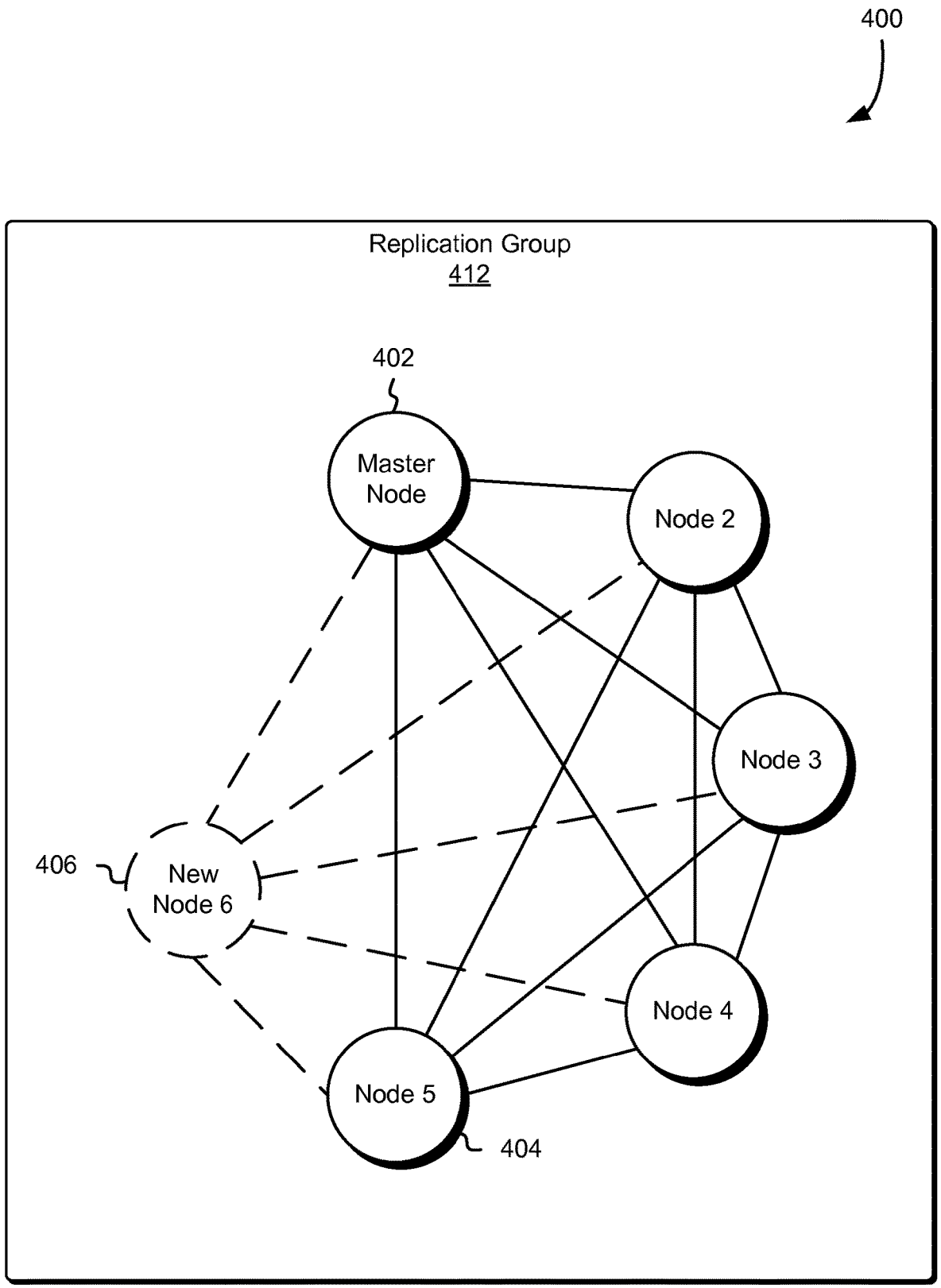
FIG. 4 illustrates configuration properties of a replication group, including replication group nodes, which may be used for implementing various types of consensus, according to at least one embodiment.

FIG. 4 illustrates an environment 400 in which a data replication group 412 may implement a consensus protocol between one or more nodes 404 in accordance with at least one embodiment. The data replication group 412 may include, as described above in connection with FIG. 3, a master node 402 and one or more nodes 404. In addition, the data replication group 412 illustrated in FIG. 4 may include a new node 406. The new node 406 may be a node 404 in the process of being added to the data replication group 412. Adding a new node 406 may include a variety of operations such as determining a suitable physical host, loading software or other executable code into memory of a physical host, establishing communications between the new nodes 406 and the nodes 404, updating a database or other data store with information corresponding to the new node 406, exchanging consensus protocol messages between the new node 406 and the nodes 404 and/or master node 302, and any other operation suitable for adding a new node 404 to a set of nodes 404 of a data replication group 412.

The data replication group 412 illustrated in FIG. 4 may implement a dynamic provisioning strategy for node 404 of the data replication group. This dynamic provisioning strategy may be contrasted to a static provision strategy in which the total number of the nodes 404 included in the data replication group 412 must be initialized before the data replication group may begin to receive traffic. Under a dynamic provisioning strategy, the membership of the data replication group 412 (e.g., the nodes 404, new nodes, 406, and master nodes 402 participating in the data replication group 412) may dynamically change while the data replication group 412 may receive traffic and perform various operations once at least one node 404 is provisioned. This strategy may improve the latency involved in provisioning the data replication group 412.

The dynamic provisioning strategy may include provisioning at least one new node 406 as an initial member of the data replication group 412. In various embodiments, the new node 406, once provisioned, is assigned the role of master node 402 as well as any other role required to implement the consensus protocol executed by the data replication group 412. Provisioning a single node 404 of a data replication group may take less time than provisioning two or more nodes 404 at the same time. As a result, provisioning a data replication group 412 according to the dynamic provisioning strategy may enable the data replication group 412 to receive traffic sooner than a static provisioning strategy under which all the nodes 404 of the data replication group 412 must all be initialized and operational before the data replication group can receive traffic. Furthermore, under the dynamic provisioning strategy, once the data replication group 412 is initialized with at least the master node 402, the data replication group 412 may be associated with the customer, other service, or resource such that the data replication group 412 can store data on behalf of the customer, other service, or resource.

Returning to FIG. 4, the data replication group 412 illustrated may be already associated with a customer, other service, or resource and may be receiving traffic (e.g., storage requests). Furthermore, the data replication group 412 may be in the process of adding additional nodes 404 until the desired number of nodes 404 is reached under the dynamic provisioning strategy. Specifically, the data replication group 412 may have previously added node 2, node 3, node 4, and node 5 as illustrated in FIG. 4. The data replication group 412 may now be adding new node 406 (i.e., node 6) to the data replication group 412. New node 406 may be provisioned as described herein. For example, the data replication group 412 may determine a suitable physical host and may load software or other executable instructions into memory of the physical host. The data replication group 412 may then add the new node 406 to the set of nodes 404 and begin implementing the consensus protocol between the new node 406 and the nodes 404. Under the dynamic provisioning strategy, new nodes 406 may be added to the data replication group until the desired number of nodes 404 is reached. The number of nodes 404 in the data replication group such that a desired resiliency is achieved. For example, the number of nodes 404 in the data replication group may be such that the probability of a certain number of nodes 404 failing concurrently is below or within a threshold. Additionally, the physical hosts selected to implement the nodes 404 may be selected to increase resiliency. For example, the physical hosts may be distributed across various servers computer systems and networks to ensure that failure of one particular physical host or network does to impact a number of nodes 404 that would cause the entire data replication group to fail or otherwise become compromised.

Figure 5:
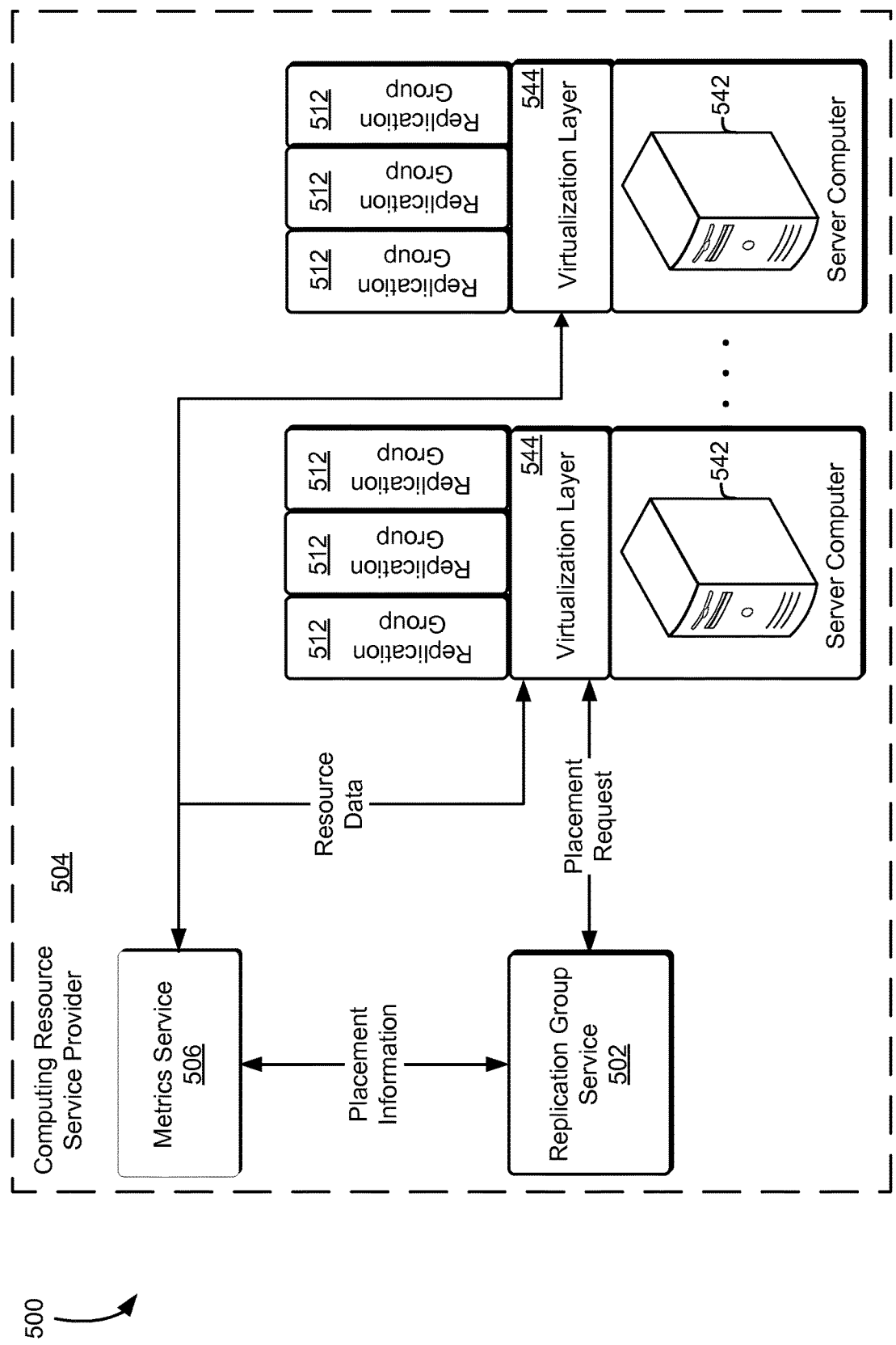
FIG. 5 illustrates an environment in which various aspects of creating replication groups and data replicas may be implemented in accordance with at least one embodiment.

FIG. 5 illustrates replication group service 502 in accordance with at least one embodiment. The replication group service 502, which may be implemented by physical hardware, is used by a computing resource service provider 504 to provide durable storage resources for customers and/or other services of the computing resource service provider 504. The physical hardware may include a server computer 542. The server computer 542 may be any device or equipment configured to execute instructions for performing data computation, manipulation, or storage tasks, such as a computer or a server. A server computer 542 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 544 may include a bare metal hypervisor or a hosted hypervisor. The virtualization layer 544 executing on the service computer 542 enables the physical hardware to be used to provide computational resources upon which one or more data replication group 512 and/or component thereof such as a node, master node, or new node as described above may operate. For example, the virtualization layer 544 may enable a particular node of a data replication group 512 to access physical hardware on the server computer 542 through virtual device drivers or other executable code on the node. The virtualization layer 544 may include a hypervisor or virtualization software and/or hardware. The virtualization layer 544 may also include an instance of an operating system dedicated to administering the data replication group 512 or component thereof running on the server computer 542. Each virtualization layer 544 may include its own networking software stack, responsible for communication with other virtualization layers 544 and, at least in some embodiments, also responsible for implementing network connectivity between the data replication group 512 or components thereof running on the server computer 542 and other data replication group 512 running on other server computers 542.

Furthermore, the server computer 542 may host multiple virtualization layers 544 of the same or different types on the same server computer 542 as well as data replication groups 512 of the same or different types. For example, a server computer system 542 may host a first node of a first data replication group that is a member of a pool of data replication groups 512 and may host a second node that is a member of a data replication group 512 implementing a dynamic provisioning strategy as described above. The virtualization layer 544 may be any device, software, or firmware used for providing a virtual computing platform and/or virtualized computing resources for the data replication group 512 and/or component thereof. The virtual computing platform may include various virtual computer components, such as one or more virtual CPUs, virtual memory, and the like. The data replication group 512 may be provided to the customers or other service of the service provider 504 and the customers may store data or other information on the data replication group 512 or component therefor. Further, the computing resource service provider 504 may use one or more of its own data replication group 512 for supporting execution of its applications and providing storage for such applications.

Commands and other information may be included in an API call from the replication group service 502 or a metrics service 506, described in greater detail below, to the virtualization layer 544. The replication group service 502 may enable the customers and other services of the computing resource service provider 504 to manage and operate the data replication group 512. For example, the customer may transmit a request to the replication group service 502 to associate a data replication group 512 with a storage device operated by the customer. The request may be an API call including information corresponding to the customer, the storage device, and the requested data replication group 512. The replication group service 502 may determine the corresponding virtualization layer 544 for the data replication group 512 included in the request and transmit a command to the virtualization layer 544 to update an association of the requested data replication group 512 such that the data replication group is associated with the storage device.

Additionally, a metrics service 506 may be responsible for collecting resource data corresponding to the data replication group 512, nodes thereof, and server computer system 542. The resource data obtained by the metrics service 506 may indicate the utilization of various components of the data replication groups 512 and server computer systems 542 executing the data replication groups 512 such as the central processing unit, memory, networking interface, operating system, applications, and any other information corresponding to the execution of the data replication groups by the server computer systems 542. The resource data may further indicate and/or include information corresponding to a location of the server computer system 542, location of various components of the data replication groups 512, and location of various data replication groups 512. This information may be used for a variety of different purposes, for example, determining a suitable host for initializing new data replication groups 512 or new nodes of the data replication groups. Additionally, the information may be used by the replication group service 502 or other service such as a maintenance service to determine the health of a particular data replication group 512, component thereof, and/or a particular server computer 542. The metrics service 506 may obtain and aggregate utilization information for all of the data replication groups 512 and components thereof.

In a specific embodiment, the replication group service 502 may initiate provisioning of a new data replication group 512. The data replication group service 502 may request placement information from the metrics service 506. The placement information may indicate the placement of existing data replication groups 512 as well as potential locations for the new data replication group 512. The replication group service 502 may query the metrics service 506 for potential placement locations (e.g., available server computer systems 542) to host one or more nodes of the new data replication group 512 or new nodes of an existing data replication group 512. The query may include one or more constraints on the placement locations for the new data replication groups 512 and/or nodes thereof. The one or more constraints may include constraints such that at least a portion of the nodes of the new data replication group 512 are executed by at least a plurality of distinct server computers 542. Other constraints may be provided in the query in order to maintain durability of the data replication groups, increase fault tolerance, maximize resource utilization of the computing resources of the computing resource service provider 504, reduce network traffic, reduce latency of the data replication group 512, or any other such constraint suitable for determining an appropriate placement of data replication groups 512 and/or nodes thereof.

Once a suitable location for a new data replication group 512 or new node of a data replication group 512 is determined, the replication group service 502 may transmit a placement request to the virtualization layer 544 or other interface of the server computer system 542 indicated by the metrics service 506 as a suitable location. The placement request may include an API call as described above. Furthermore, the placement request may indicate a data replication group 512 for which the new node is to be associated. The placement request may also indicate and/or provide software or other executable code required to implement the node and/or data replication group 512. The virtualization layer 544 may also provide information to the replication group service 503 indicating successful completion of the placement operation and/or the health of the nodes and data replication groups 512 supported by the virtualization layer 544.

Figure 6:
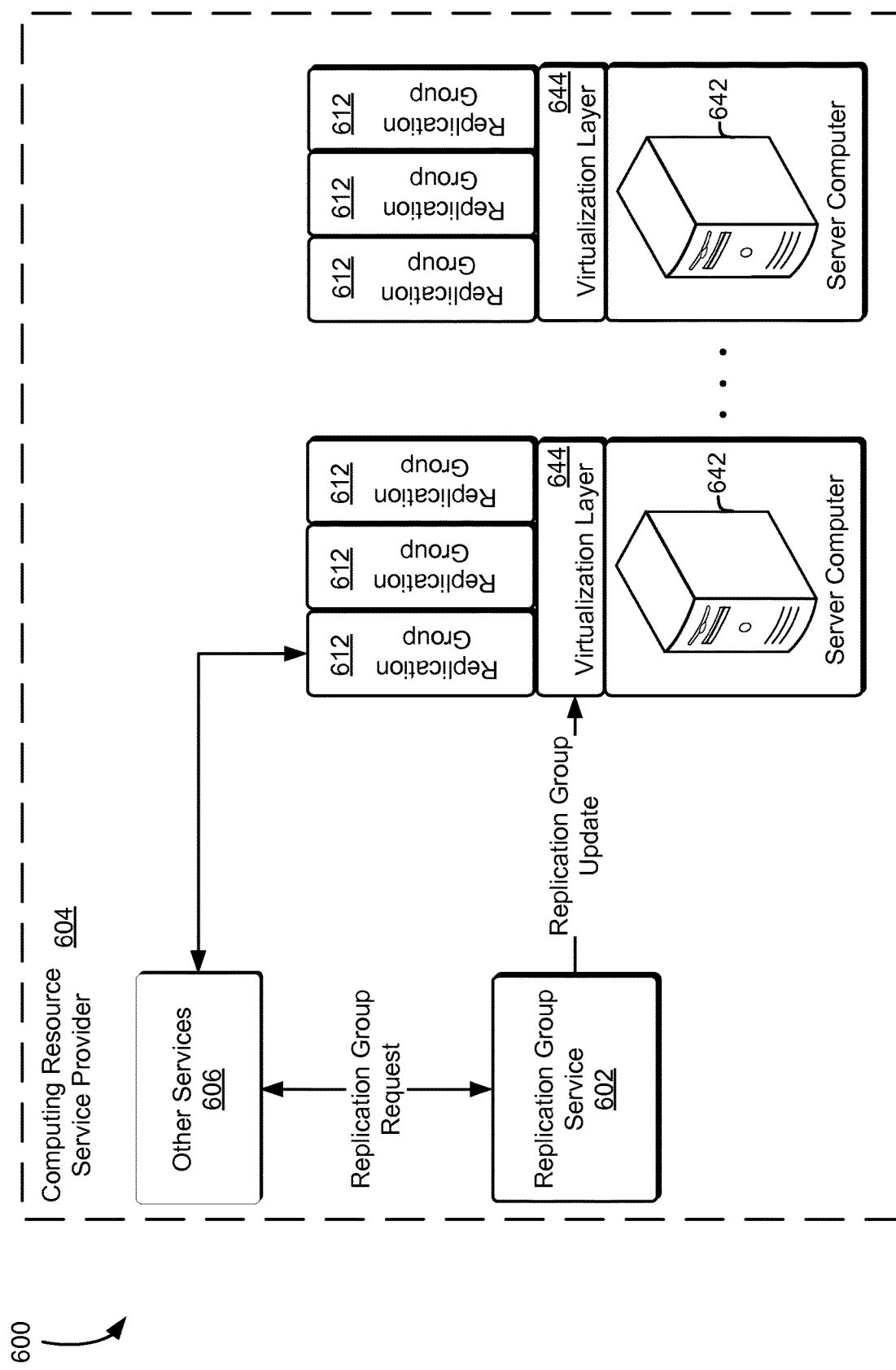
FIG. 6 illustrates an environment in which replication groups may be implemented in accordance with at least one embodiment.

FIG. 6 illustrates replication group service 602 in accordance with at least one embodiment. The replication group service 602, which may be implemented by physical hardware, is used by a computing resource service provider 604 to provide durable storage resources for customers and/or other services 606 of the computing resource service provider 604. The physical hardware may include a server computer 642. The server computer 642 may be any device or equipment configured to execute instructions for performing data computation, manipulation, or storage tasks, such as a computer or a server. A server computer 642 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 644 may include a bare metal hypervisor or a hosted hypervisor. The virtualization layer 644 executing on the service computer 642 enables the physical hardware to be used to provide computational resources upon which one or more data replication group 612 and/or component thereof such as a node, master node, or new node as described above may operate. For example, the virtualization layer 644 may enable a particular node of a data replication group 612 to access physical hardware on the server computer 642 through virtual device drivers or other executable code on the node. The virtualization layer 644 may include a hypervisor or virtualization software and/or hardware. The virtualization layer 644 may also include an instance of an operating system dedicated to administering the data replication group 612 or component thereof running on the server computer 642. Each virtualization layer 644 may include its own networking software stack, responsible for communication with other virtualization layers 644 and, at least in some embodiments, also responsible for implementing network connectivity between the data replication group 612 or components thereof running on the server computer 642 and other data replication group 612 running on other server computers 642.

Furthermore, the server computer 642 may host multiple virtualization layers 644 of the same or different types on the same server computer 642 as well as data replication groups 612 of the same or different types. For example, a sever computer system 642 may host a first node of a first data replication group that is a member of a pool of data replication groups 612 and may host a second node that is a member of a data replication group 612 implementing a dynamic provisioning strategy as described above. The virtualization layer 644 may be any device, software, or firmware used for providing a virtual computing platform and/or virtualized computing resources for the data replication group 612 and/or component thereof. The virtual computing platform may include various virtual computer components, such as one or more virtual CPUs, virtual memory, and the like. The data replication group 612 may be provided to the customers or other of the service provider 604 and the customers may store data or other information on the data replication group 612 or component therefor. Further, the computing resource service provider 604 may use one or more of its own data replication group 612 for supporting executing of its applications and providing storage for such applications.

Commands and other information may be included in an API call from the replication group service 602 or the other services 606 to the virtualization layer 644. The replication group service 602 may enable the customers and the other services 606 of the computing resource service provider 604 to manage and operate the data replication groups 612. For example, the customer may operate a virtual storage device using computing resources of the other services 606, the other services 606 may transmit a request to the replication group service 602 to associate a data replication group 612 with a virtual storage device operated by the customer and maintained by the other services 606.

The request may be an API call including information corresponding to the customer, the virtual storage device, the other services, and/or the requested data replication group 612. The replication group service 602 may determine the corresponding virtualization layer 644 for the data replication group 612 included in the request and transmit a command to the virtualization layer 644 to update an association of the requested data replication group 612 such that the data replication group is associated with the storage device. Updating the association between the one or more other services 606 and the data replication group 612 may include mapping address information or other location information between the other services 606 and the data replication group 612.

Figure 7:
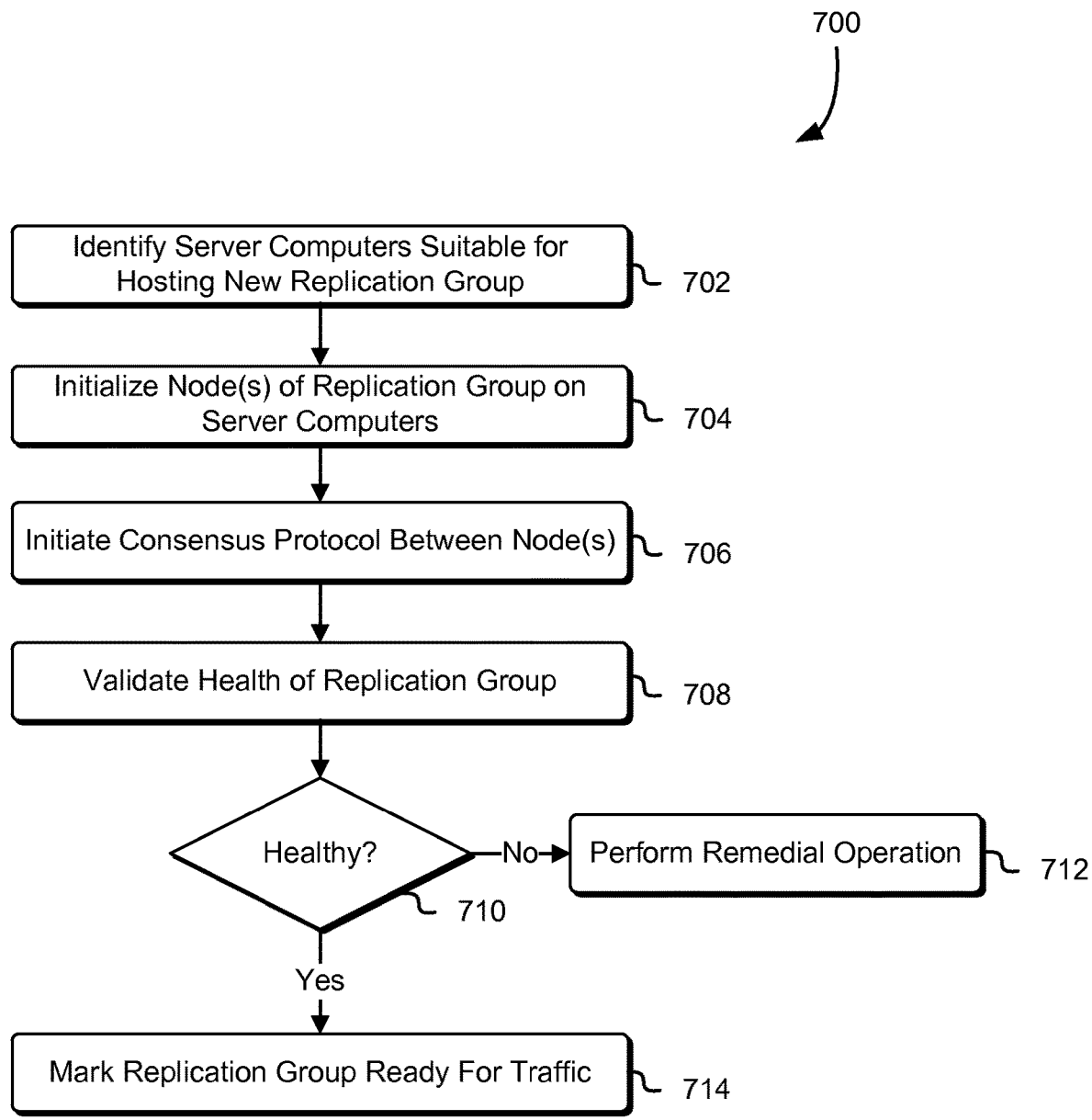
FIG. 7 shows an illustrative process which may be used to create a data replication group in accordance with at least one embodiment.

FIG. 7 is a block diagram illustrating an example of a process 700 for provisioning a data replication group consisting of one or more nodes in accordance with at least one embodiment. The process 700 may be performed by any suitable system such as a management system of a replication group service as described above in connections with FIGS. 2 and 3. The process 700 includes identifying one or more server computer systems suitable for hosting a new replication group 702. In numerous variations of the process 700, one or more server computer systems suitable for hosting one or more new nodes of an existing data replication group may be identified. As described above in connection with FIG. 5, the replication group service or component thereof, such as the management system, may query a metrics service to identify suitable server computer systems for placement of the new data replication group and/or new nodes of the data replication group. The process 700 may be initiated for a variety of responses, for example, the process 700 may be initiated to replace a node of a data replication group after one or more nodes of the data replication group has failed. In another example, the process 700 may be initiated to replace a data replication group that has been removed from a pool of data replication groups.

In step 704, once the set of server computer systems have been identified, the system performing the process 700 may initialize one or more nodes of the data replication group on the server computer systems. Initializing the one or more nodes may include transmitting a placement request to a virtualization layer or other component of the server computer systems as described above in connection with FIG. 5. The nodes may be configured such that, once initialized, the nodes commence the consensus protocol between the nodes of the data replication group 706. The node may commence the consensus protocol automatically or may commence the consensus protocol as a result of receiving a command or other request. If the node is the first and/or only member of the data replication group, the node may implement the consensus protocol with itself. As a result of executing the consensus protocol, the node may validate the health of the data replication group 708. For example, the nodes may, as a part of the consensus protocol, exchange heartbeat messages or other messages confirming the health of the member of the data replication group. In numerous variations of the process 700, the system performing the process 700 may also validate the health of the data replication group either in addition to the operation of the consensus protocol or as an alternative.

If a sufficient number of nodes of the data replication group are healthy 710, the system performing the process 700 may mark the replication group as 'ready' to receive traffic 714. Marking the data replication group as healthy may indicate that at least a sufficient number of the nodes are operating such that the consensus protocol may be executed and the data replication group may durably store data. For example, if the data replication group is executing the Paxos consensus protocol, the data replication group may be healthy if a quorum of the nodes have been validated successfully (e.g., are successfully implementing the Paxos consensus protocol). In numerous variations of the process 700, the system performing the process 700 may require that a greater number of the nodes are validated before marking the replication group as ready. For example, the system performing the process 700 may require all the nodes of a new data replication group be validated prior to enabling the new data replication group to receive traffic. Alternatively, if an insufficient number of nodes of the data replication group are healthy, the system performing the process 700 may perform remedial operations 712. Remedial operations may include terminating the data replication group and generating a new data replication group, initialized replacement nodes of any node which failed to validate, terminate any node which failed to validate, or other remedial operation as suitable for generating a data replication group.

Figure 8:
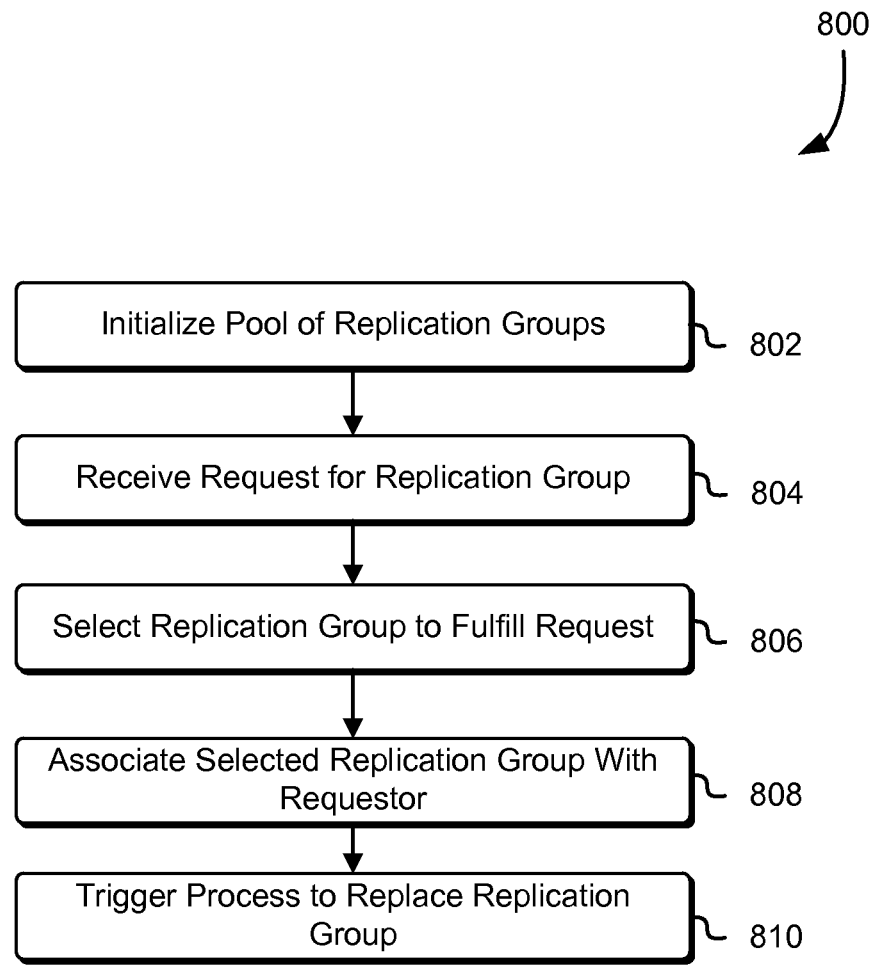
FIG. 8 shows an illustrative process which may be used to create a data replication group for use in a pool of data replication groups in accordance with at least one embodiment.

FIG. 8 is a block diagram illustrating an example of a process 800 for provisioning a pool of data replication group consisting of one or more nodes and replacing members of the pool in accordance with at least one embodiment. The process 800 may be performed by any suitable system such as a management system of a replication group service as described above in connections with FIG. 2. The process 800 includes initializing a pool of data replication groups 802. Initializing the pool of data replication groups may be performed using any suitable process such as the process described above in connection with FIG. 7 or the processes described below in connection with FIG. 9. The pool of replication groups may be initialized with any number of data replication groups. Furthermore, the number of data replication groups in the pool may be increased or decreased as needed. For example, the pool may be initialized with M data replication groups which may increase to M+N for an interval of time. The number of data replication groups in the pool may be increased, for example, to handle a spike or increase in requests for data replication groups.

At some point in time after the pool of replication groups has been initialized, the system performing the process 800 may receive a request for a replication group 804. The request may be received from a customer or other service as described above in FIGS. 2 and 6. For example, the request may be an API call from another service of the computing resource service provider to utilize a data replication group for storage of data on behalf of the other service. The system performing process 800 may then select a replication group to fulfill the request 806. The system performing process 800 may select a replication group based at least in part on one or more factors of the request and/or attributes of the data replication group. For example, the request may include a request for a data replication group consisting of at least 9 nodes or a data replication group capable of achieving certain performance requirements. In another example, the data replication group make be selected at random from the pool.

The system performing the process 800 may then associate the selected data replication group with the requestor 808. Associating the data replication group with the requestor may include mapping a network address of the data replication group to the requestor or information provided by the requestor such that the data replication group may receive traffic at the designated network address. The system performing the process 800 may trigger a process to replace the data replication group associated with the requestor. For example, the process 700 described above in FIG. 7 may be used to provision a new data replication group to replace the data replication group associated with the requestor. In numerous variations of the process 800, the process to replace the data replication group may be trigger at the expiration of an interval of time. Furthermore, if at the expiration of time, the number of data replication groups in the pool is within some threshold of the maximum number or other number of data replication groups in the pool, the process may determine not to add new data replication groups to the pool. In yet another variation to the process 800, the process to replace the replication groups may be triggered based at least in part on a rate of received requests for data replication groups.

Figure 9A:
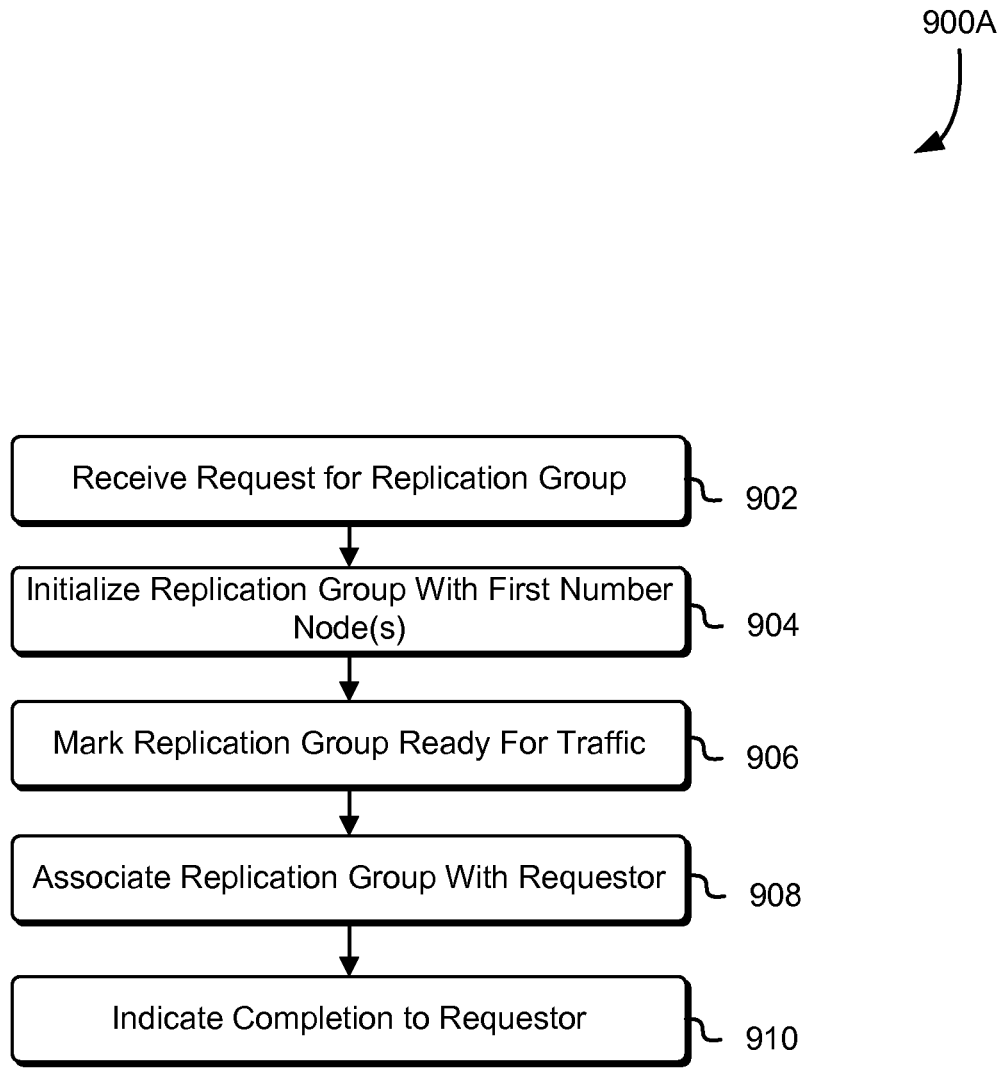
FIG. 9A shows an illustrative process which may be used to create a data replication group in accordance with at least one embodiment.

FIG. 9A is a block diagram illustrating an example of a process 900A for provisioning a data replication group consisting of one or more nodes using a dynamic provisioning method in accordance with at least one embodiment. The process 900A may be performed by any suitable system such as a management system of a replication group service as described above in connections with FIG. 1. The process 900A includes receiving a request for a data replication group 902. The request may be received at an interface of the replication group service as described above in connection with FIGS. 1 and 2. The request may be from a customer or other service to utilize the computing resources of the data replication group to store data on behalf of the customer or other service. The system performing the process 900A may then initialize a data replication group with a first number of nodes 904. The first number of nodes may be any number of nodes less than the total number of nodes required for the data replication group. For example, the data replication group may be configured to have a total number of seven nodes and the data replication group may be initialized with one node in step 904 of the process 900A. The first node may implement a consensus protocol as described above in order to durably store data.

The node may be initialized as described above in connection with FIG. 7. For example, the system performing the process 900A may determine a suitable location for the node in a distributed computing environment as illustrated in FIG. 5. Once the first number of nodes have been initialized, the data replication group may be marked as 'ready' for traffic 906. Marking the data replication group as ready for traffic may include updating a database entry associated with the data replication group indicating that the data replication group is operational and can receive traffic. Once the data replication group has been marked as ready, the system performing the process 900A may associate the data replication group with the requestor 908. Associating the data replication group with the requestor may include any process suitable for enabling the data replication group to receive I/O requests on behalf of the requestor and/or from the requestor. For example, associating the data replication group with the requestor may include mapping a network address of the data replication group to the requestor or information provided by the requestor such that the data replication group may receive traffic at the designated network address. Furthermore, the system preforming the process 900A may provide an indication to the requestor that the process of creating the data replication group is complete 910. This indication may cause the requestor to begin to store data with the data replication group. In numerous variations of the process 900A, the system preforming the process 900A may continue to add new nodes to the data replication group after indicating that the process of creating the data replication group is complete.

Figure 9B:
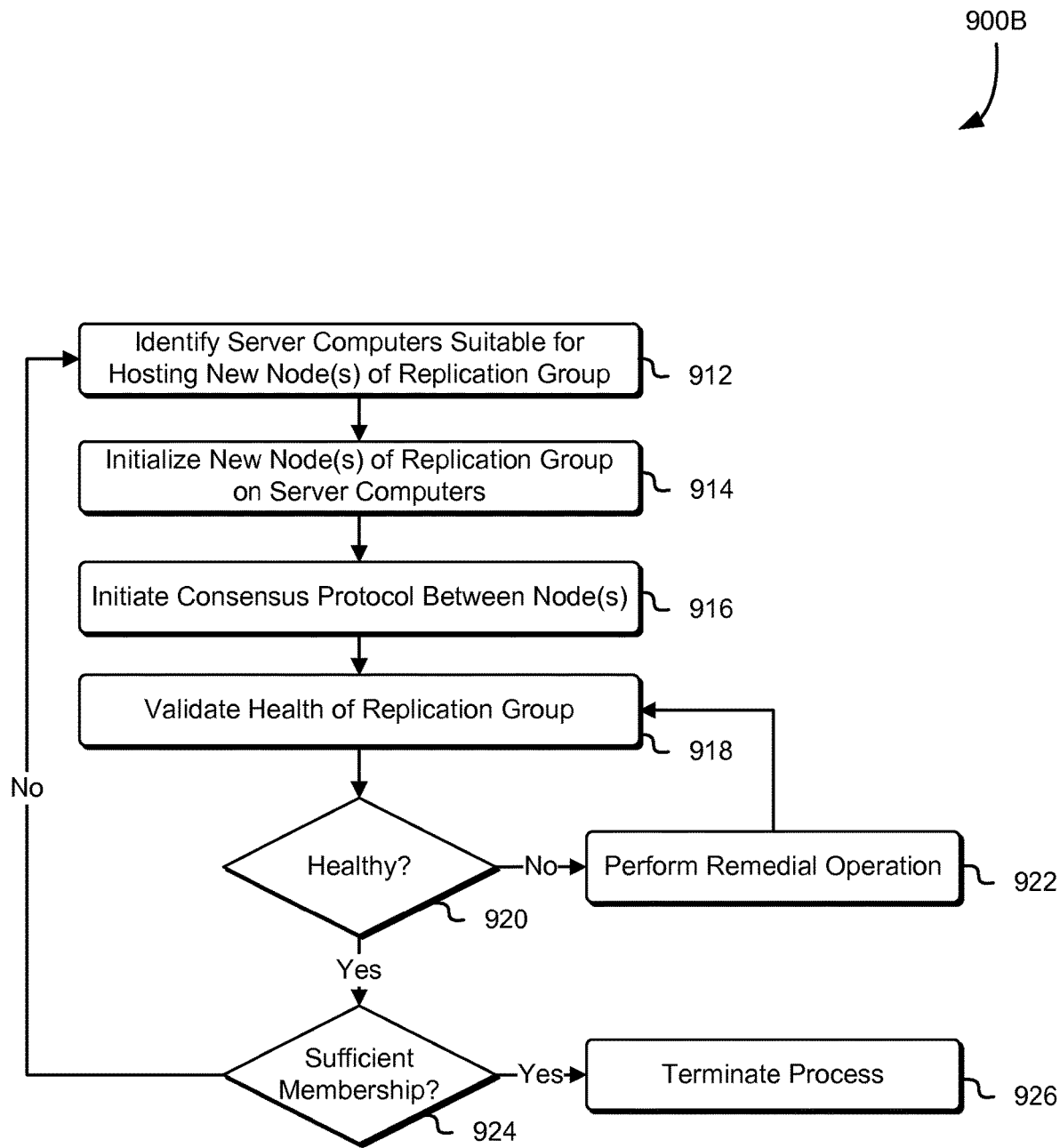
FIG. 9B shows an illustrative process which may be used to create a data replication group in accordance with at least one embodiment.

FIG. 9B is a block diagram illustrating an example of a process 900B for provisioning a data replication group consisting of one or more nodes using a dynamic provisioning method in accordance with at least one embodiment. The process 900B may be performed by any suitable system such as a management system of a replication group service as described above in connections with FIG. 1. The process 900B includes identifying a set of server computer systems suitable for hosting one or more new nodes of the data replication group 912. The system performing the process 900B may continue to add nodes to a data replication group, created using the process 900A as described above, while the data replication group is still receiving traffic until a certain number of nodes are added to the data replication group. Specifically, in step 910, the system performing the process 900B may identify the set of server computer systems suitable for hosting the one or more new nodes of the data replication group created as a result of the process 900A. As described above in connection with FIG. 5, the replication group service or component thereof, such as the management system, may query a metrics service to identify suitable server computer systems for placement of the new nodes of the data replication group. Any number of placement locations for new nodes may be identified as potential new nodes which may be added to the data replication group. The system performing process 900B may select any number of the identified locations to host a new node for addition to the data replication group. For example, the metrics service may identify 100 potential locations for new nodes of the data replication group and the system performing the process 900B may select a single location to host one new node of the data replication group.

One or more new nodes of the data replication group may then be initialized on the identified server computer systems 914. Initializing the new nodes may include transmitting one or more commands to a virtualization layer or computer system supported by a virtualization layer of the selected server computer system. The new nodes may then initiate a consensus protocol between the new nodes and the existing nodes of the data replication group 916. The new node may commence the consensus protocol automatically or may commence the consensus protocol as a result of receiving a command or other request. For example, the system performing the process 900B may, once initialized, transmit a command to the new node to commence the consensus protocol with the existing members of the data replication group. The command may include information suitable to determining the existing members of the data replication group.

In step 918, the health of the replication group may be validated. This may include determining the status of all the nodes associated with the data replication group. In numerous variations of the process 900B, validating the health of the data replication group may include only validating the health of the new nodes added to the data replication group. Furthermore, validating the health of the nodes may be performed as a process of the consensus protocol. If the health of the data replication group is validated 920, the system performing the process 900B may then determine if there is sufficient membership 924 in the data replication group. Determining if there is sufficient membership may include determining if the number of nodes of the data replication group is equal to or greater than a defined number of nodes required for the data replication group. If there is insufficient membership, the system performing the process 900B may return to step 912 and add new nodes until the membership requirement is satisfied.

Returning to step 920 above, if the data replication group is not validated, the system performing the process 900B may perform remedial operations 922. Remedial operations may include terminating the data replication group and generating a new data replication group, initializing replacement nodes of any node which failed to validate, terminating any node which failed to validate, or other remedial operation as suitable for generating a data replication group. Once the health of the data replication group has been validated and there are sufficient nodes in the data replication group to satisfy the membership requirements, the process may be terminated 926.

Figure 10:
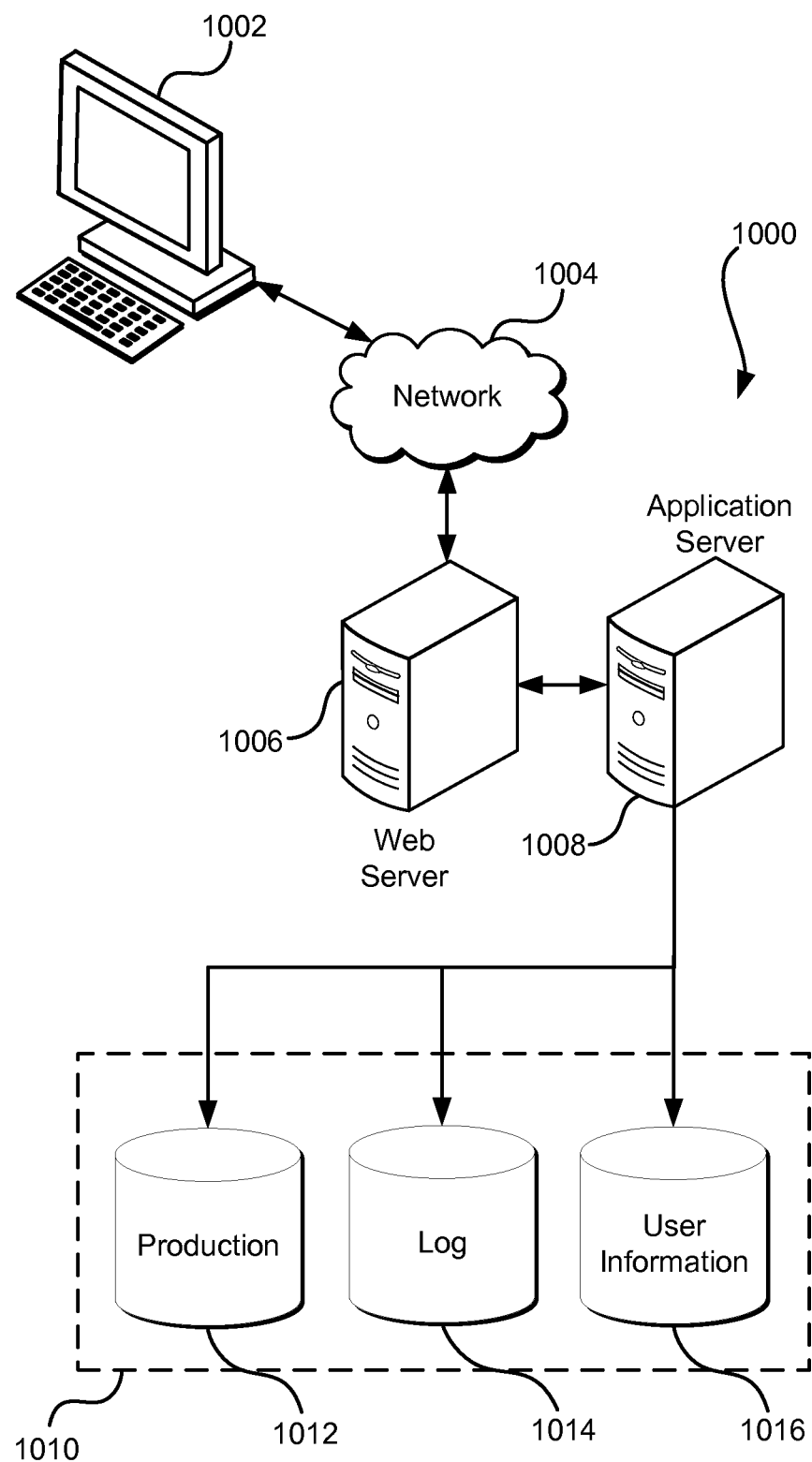
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request for a data replication group, the data replication group to have a total number of nodes;
fulfilling the request by at least:
provisioning a first number of nodes of the data replication group, the first number of nodes being less than the total number of nodes, wherein the first number of nodes is selected according to a latency threshold indicated in the request;
implementing a consensus protocol on the first number of nodes of the data replication group;
storing information separate from consensus protocol data, the information corresponding to the data replication group indicating that the first number of nodes of the data replication group is ready to receive traffic, the information configured to enable the one or more computer systems to determine that the indicated first number of nodes of the data replication group can be used to fulfill requests; and
mapping location information of the data replication group with a requestor responsible for submitting the request; and
adding new nodes to the data replication group until the total number of nodes of the data replication group is reached while the data replication group receives traffic on behalf of the requestor.

2. The computer-implemented method of claim 1, wherein the first number of nodes of the data replication group is one.

3. The computer-implemented method of claim 1, wherein adding new nodes to the data replication group further comprises adding a plurality of new nodes to the group at a certain point in time.

4. The computer-implemented method of claim 1, wherein adding new nodes to the data replication group further comprises identifying a group of server computer systems for hosting the new nodes based at least in part on one or more constraints on placement of the new nodes in a distributed computing environment, the one or more constraints on placement causing the group of computer systems to be identified such that at least a first portion of the node are hosted by a first computer system of the group of server computer system and a second portion of the nodes are hosted by a second computer system of the group of server computer systems.

5. A system, comprising:
one or more processors;
memory that includes instructions that, when executed by the one or more processors, cause the system to:
provision a data replication group with a first number of nodes, where the first number of nodes is less than a total number of nodes of the data replication group, wherein the first number of nodes is selected based at least in part on a provisioning time associated with the data replication group;
while the data replication group has the first number of nodes but before having the total number of nodes, associate the data replication group with a computing resource such that the data replication group stores data on behalf of the computing resource;
provision a second number of nodes over an interval of time; and
add the provisioned second number of nodes to the data replication group, where the first number of nodes combined with the second number of nodes is equal to or greater than the total number of nodes of the data replication group.

6. The system of claim 5, wherein the memory further includes instructions that, when executed by the one or more processors, cause the system to provision the data replication group as a result of receiving a request, from a requestor responsible for operating the computing resource, for the data replication group.

7. The system of claim 5, wherein the memory further includes instructions that, when executed by the one or more processors, cause the system to include the data replication group in a pool of data replication groups.

8. The system of claim 5, wherein the memory further includes instructions that, when executed by the one or more processors, cause the system to cause the first number of nodes to implement a consensus protocol, where the consensus protocol does not require all members implementing the protocol to be initialized before the protocol can be executed.

9. The system of claim 8, wherein the consensus protocol is a Paxos consensus protocol.

10. The system of claim 5, wherein the memory further includes instructions that, when executed by the one or more processors, cause the system to identify one or more server computer systems for placement of the second number of nodes.

11. The system of claim 5, wherein the memory further includes instructions that, when executed by the one or more processors, cause the system to:
receive, prior to provisioning the second number of nodes, a request to store data; and
cause the data replication group including the first number of nodes to fulfill the request.

12. The system of claim 5, wherein the memory further includes instructions that, when executed by the one or more processors, cause the system to replace one or more unhealthy nodes of the data replication group with one or more new nodes.

13. A non-transitory computer-readable storage medium having stored thereon executable instructions that, when executed by one or more processors of a computer system, cause the computer system to at least:
cause a first number of nodes of a data replication group to be executed by a host computer system, where the data replication group comprises a total number of nodes greater than the first number of nodes, wherein the first number of nodes is selected to reduce a provisioning time associated with the data replication group;
enable the data replication group to receive traffic while comprising the first number of nodes but before comprising the total number of nodes;
cause a set of new nodes to be executed by one or more host computer systems, where the first number of nodes and the set of nodes are greater than or equal to the total number of nodes of the data replication group; and
cause the set of new nodes to be added to the data replication group.

14. The non-transitory computer-readable storage medium of claim 13, wherein the instructions further comprise instructions that, when executed by the one or more processors, cause the computer system to implement a consensus protocol between one or more nodes of the data replication group, where the consensus protocol does not require the one or more nodes to be initialized before the protocol can be executed.

15. The non-transitory computer-readable storage medium of claim 13, wherein the instructions further comprise instructions that, when executed by the one or more processors, cause the computer system to store customer data among one or more nodes of the data replication group.

16. The non-transitory computer-readable storage medium of claim 13, wherein the instructions further comprise instructions that, when executed by the one or more processors, cause the computer system to store data received from one or more services of a computing resource service provider.

17. The non-transitory computer-readable storage medium of claim 13, wherein the instructions that cause the computer system to cause a set of new nodes to be executed by one or more host computer systems further include instructions that cause the computer system to identify the one or more host computer systems by at least transmitting a request to a service of a computing resource service provider for potential placement locations of the nodes on the one or more host computer system based at least in part on one or more constraints.

18. The non-transitory computer-readable storage medium of claim 13, wherein the instructions further comprise instructions that, when executed by the one or more processors, cause the computer system to replicate data stored by at least one of the first number of nodes to the new nodes of the data replication group.

19. The non-transitory computer-readable storage medium of claim 13, wherein the instructions further comprise instructions that, when executed by the one or more processors, cause the computer system to add the new nodes to the data replication group individually.

20. The non-transitory computer-readable storage medium of claim 13, wherein the instructions further comprise instructions that, when executed by the one or more processors, cause the computer system to concurrently add a plurality of the new nodes to the data replication group over an interval of time.

* * * * *